United States Patent
Kell et al.

(10) Patent No.: US 10,611,022 B2
(45) Date of Patent: Apr. 7, 2020

(54) METHODS, APPARATUS, COMPUTER PROGRAMS AND NON-TRANSITORY COMPUTER READABLE STORAGE MEDIUMS FOR CONTROLLING A HYPER REDUNDANT MANIPULATOR

(71) Applicant: ROLLS-ROYCE plc, London (GB)

(72) Inventors: James Kell, Nottingham (GB); Dragos A. Axinte, Nottingham (GB); David I. Palmer, Nottingham (GB); John Billingham, Teigh (GB)

(73) Assignee: ROLLS-ROYCE plc, London (GB)

( * ) Notice: Subject to any disclaimer, the term of this patent is extended or adjusted under 35 U.S.C. 154(b) by 318 days.

(21) Appl. No.: 15/813,590

(22) Filed: Nov. 15, 2017

(65) Prior Publication Data
US 2018/0147720 A1   May 31, 2018

(30) Foreign Application Priority Data
Nov. 29, 2016  (GB) ...................... 1620117

(51) Int. Cl.
*G05B 19/04* (2006.01)
*G05B 19/18* (2006.01)
(Continued)

(52) U.S. Cl.
CPC ............ *B25J 9/065* (2013.01); *B25J 9/1602* (2013.01); *B25J 9/1625* (2013.01); *B25J 9/1674* (2013.01); *Y10S 901/02* (2013.01)

(58) Field of Classification Search
CPC ........ B25J 9/065; B25J 9/1625; B25J 9/1602; B25J 9/1674; B25J 9/1635; Y10S 901/02
See application file for complete search history.

(56) References Cited

U.S. PATENT DOCUMENTS 5,129,044 A * 7/1992 Kashiwagi ............. B25J 9/1633
                                                                  700/251
6,378,387 B1 * 4/2002 Froom .................. G01M 5/0016
                                                                  73/865.8
(Continued)

FOREIGN PATENT DOCUMENTS

| DE | 4226854 | 2/1994 |
| WO | 2009130444 | 10/2009 |
| WO | 2017062648 | 4/2017 |

OTHER PUBLICATIONS

David Palmer; Salvador Cobos-Guzman and Dragos Axinte, "Real-time method for tip following navigation of continuum snake arm robots," Robotics and Autonomous Systems vol. 62, Issue 10, Oct. 2014, pp. 1478-1485.*

(Continued)

*Primary Examiner* — Khoi H Tran
*Assistant Examiner* — Jorge O Peche
(74) *Attorney, Agent, or Firm* — Shumaker & Sieffert, P.A.

(57) ABSTRACT

Methods of controlling a hyper redundant manipulator, the hyper redundant manipulator including: a plurality of sections comprising a first free end section and a second end section; and a base arranged to receive the plurality of sections in a coiled configuration, the base being coupled to the second end section of the plurality of sections, the method comprising: receiving a trajectory for movement of the plurality of sections; determining an error in position and/or orientation relative to the trajectory for one or more sections of the plurality of sections, the error being caused at least in part by the coiled configuration; and controlling movement of the one or more sections using the determined error to compensate for the error in position and/or orientation of the one or more sections.

20 Claims, 8 Drawing Sheets

(51) Int. Cl.
*B25J 9/06* (2006.01)
*B25J 9/16* (2006.01)

(56) References Cited

U.S. PATENT DOCUMENTS

| | | | | |
|---|---|---|---|---|
| 6,822,412 B1* | 11/2004 | Gan | ............... | B25J 9/1692 318/568.11 |
| 6,968,224 B2* | 11/2005 | Kessman | ............... | A61B 8/0841 128/916 |
| 7,099,745 B2* | 8/2006 | Ebert | ............... | B25J 9/1694 244/189 |
| 7,117,067 B2* | 10/2006 | McLurkin | ............... | G05D 1/0297 700/245 |
| 7,171,279 B2* | 1/2007 | Buckingham | ............... | A61B 1/0055 318/568.12 |
| 7,387,179 B2* | 6/2008 | Anhalt | ............... | B08B 9/045 180/9.1 |
| 8,219,246 B2 | 7/2012 | Buckingham et al. | | |
| 8,635,928 B2 | 1/2014 | Graham et al. | | |
| 9,149,929 B2* | 10/2015 | Motzer | ............... | B25J 9/162 |
| 9,193,073 B1* | 11/2015 | Huang | ............... | B25J 9/1692 |
| 9,628,775 B2* | 4/2017 | Bridges | ............... | G01B 21/047 |
| 2002/0032365 A1* | 3/2002 | Hasegawa | ............... | A61B 1/0052 600/102 |
| 2002/0140392 A1* | 10/2002 | Borenstein | ............... | B08B 9/045 318/568.12 |
| 2003/0018412 A1* | 1/2003 | Kimura | ............... | B25J 9/1605 700/245 |
| 2003/0089183 A1* | 5/2003 | Jacobsen | ............... | G01N 29/045 73/865.8 |
| 2004/0013295 A1* | 1/2004 | Sabe | ............... | G06K 9/00664 382/153 |
| 2004/0140786 A1* | 7/2004 | Borenstein | ............... | B08B 9/045 318/568.12 |
| 2005/0007055 A1* | 1/2005 | Borenstein | ............... | B08B 9/045 318/568.12 |
| 2006/0207419 A1* | 9/2006 | Okazaki | ............... | B25J 9/142 91/35 |
| 2006/0269387 A1* | 11/2006 | Yamaguchi | ............... | B08B 9/045 414/729 |
| 2008/0097156 A1* | 4/2008 | Nakamura | ............... | A61B 1/045 600/117 |
| 2008/0302200 A1* | 12/2008 | Tobey | ............... | B25J 5/007 74/490.02 |
| 2009/0086199 A1* | 4/2009 | Troy | ............... | G01C 1/04 356/251 |
| 2009/0105880 A1* | 4/2009 | Okazaki | ............... | B25J 9/1633 700/258 |
| 2010/0152899 A1* | 6/2010 | Chang | ............... | B25J 9/162 700/262 |
| 2010/0153051 A1* | 6/2010 | Georgeson | ............... | G01C 15/002 702/95 |
| 2010/0168915 A1* | 7/2010 | Kagawa | ............... | B25J 9/1692 700/254 |
| 2010/0188510 A1* | 7/2010 | Yoo | ............... | G05D 1/0234 348/164 |
| 2010/0228506 A1* | 9/2010 | Motzer | ............... | G01N 29/043 702/56 |
| 2011/0078508 A1* | 3/2011 | Komatsu | ............... | B25J 9/1075 714/37 |
| 2011/0190932 A1* | 8/2011 | Tsusaka | ............... | B25J 13/08 700/254 |
| 2011/0208355 A1* | 8/2011 | Tsusaka | ............... | B25J 9/1664 700/246 |
| 2013/0131868 A1* | 5/2013 | Rucker | ............... | B25J 9/1625 700/262 |
| 2013/0310977 A1* | 11/2013 | Tsusaka | ............... | B25J 9/1656 700/257 |
| 2014/0107843 A1* | 4/2014 | Okazaki | ............... | B25J 13/085 700/260 |
| 2016/0183419 A1* | 6/2016 | Fujita | ............... | H05K 13/0452 29/739 |
| 2018/0243900 A1* | 8/2018 | Tanaka | ............... | B25J 9/065 |
| 2019/0015978 A1* | 1/2019 | Takagi | ............... | B25J 9/1625 |
| 2019/0184553 A1* | 6/2019 | Takagi | ............... | B25J 9/163 |
| 2019/0212359 A1* | 7/2019 | Erivantcev | ............... | G06F 3/0425 |

OTHER PUBLICATIONS

Palmer, et al., "Real-Time Method for Tip Following Navigation of Continuum Snake Arm Robots," Robotics and Autonomous Systems 62 (2014) pp. 1479-1485.

Great Britain Search Report dated May 23, 2017, issued in GB Patent Application No. 1620117.0.

European Search Report dated Apr. 30, 2018, issued in EP Patent Application No. 17199352.

* cited by examiner

METHODS, APPARATUS, COMPUTER PROGRAMS AND NON-TRANSITORY COMPUTER READABLE STORAGE MEDIUMS FOR CONTROLLING A HYPER REDUNDANT MANIPULATOR

CROSS-REFERENCE TO RELATED APPLICATION

This application is based upon and claims the benefit of priority from British Patent Application Number 1620117.0 filed on 29 Nov. 2016, the entire contents of which are incorporated by reference.

BACKGROUND OF THE INVENTION

The present disclosure concerns methods, apparatus, computer programs and non-transitory computer readable storage mediums for controlling a hyper redundant manipulator.

BRIEF SUMMARY OF THE DISCLOSURE

Hyper redundant manipulators are robots that have a number of actuated degrees of freedom that exceed the minimal number required to perform a particular task. For example, a robot that is required to position and orient an object in space needs six actuated degrees of freedom, so a robot with seven or more degrees of freedom is redundant with respect to this task. Examples of hyper redundant manipulators include (but are not limited to) "snake arm" robots and "elephant trunk" robots.

Hyper redundant manipulators may be used in industry to perform inspection and/or repair activities on an article. For example, a hyper redundant manipulator may be inserted into a gas turbine engine through a borescope port or through the fan to inspect the interior of the gas turbine engine for wear and/or damage. By way of another example, a hyper redundant manipulator may be inserted into a gas turbine engine to carry out a repair activity on a component within the gas turbine engine (blending of a leading edge of a compressor blade for example).

In order to move the free end of the hyper redundant manipulator within the gas turbine engine, the hyper redundant manipulator may be mounted on a linear track or a mobile platform. However, linear tracks and mobile platforms usually require a significant amount of space outside of the article which may be undesirable and may even prohibit their use in certain instances.

BRIEF SUMMARY OF THE DISCLOSURE

According to various examples there is provided a method of controlling a hyper redundant manipulator, the hyper redundant manipulator including: a plurality of sections comprising a first free end section and a second end section; and a base arranged to receive the plurality of sections in a coiled configuration, the base being coupled to the second end section of the plurality of sections, the method comprising: receiving a trajectory for movement of the plurality of sections; determining an error in position and/or orientation relative to the trajectory for one or more sections of the plurality of sections, the error being caused at least in part by the coiled configuration; and controlling movement of the one or more sections using the determined error to compensate for the error in position and/or orientation of the one or more sections.

The error in position and/or orientation relative to the trajectory may comprise a lateral component.

The error in position and/or orientation relative to the trajectory may comprise a vertical component.

Controlling movement of the one or more sections using the determined error may comprise controlling movement of a plurality of sections to form an S-bend profile.

The method may further comprise controlling the base to rotate in a first direction to coil the plurality of sections onto the base.

The method may further comprise controlling the base to rotate in a second direction to uncoil the plurality of sections from the base.

The plurality of sections may have a length between the first free end section and the second end section. The method may further comprise determining a coiled profile, one or more uncoiling profiles, and one or more handover positions using the coiled configuration, the trajectory and the length of the plurality of sections.

The method may further comprise controlling storage of the determined coiled profile, the one or more determined uncoiling profiles, and the one or more determined handover positions in a memory.

Determining the error in position and/or orientation may include comparing the trajectory with one of the one or more determined uncoiling profiles.

The method may further comprise determining control of movement of a plurality of sections between the first free end section and a handover position along the trajectory using a tip following algorithm. The tip following algorithm may use one of the one or more determined handover positions as a starting position for tip following.

The hyper redundant manipulator may be a continuum robot.

The coiled configuration may be a helical configuration.

According to various examples there is provided a computer program that, when read by a computer, causes performance of the method as described in any of the preceding paragraphs.

According to various examples there is provided a non-transitory computer readable storage medium comprising computer readable instructions that, when read by a computer, cause performance of the method as described in any of the preceding paragraphs.

According to various examples there is provided apparatus for controlling a hyper redundant manipulator, the hyper redundant manipulator including: a plurality of sections comprising a first free end section and a second end section; and a base arranged to receive the plurality of sections in a coiled configuration, the base being coupled to the second end section of the plurality of sections, the apparatus comprising a controller configured to: receive a trajectory for movement of the plurality of sections; determine an error in position and/or orientation relative to the trajectory for one or more sections of the plurality of sections, the error being caused at least in part by the coiled configuration; and control movement of the one or more sections using the determined error to compensate for the error in position and/or orientation of the one or more sections.

The error in position and/or orientation relative to the trajectory may comprise a lateral component.

The error in position and/or orientation relative to the trajectory may comprise a vertical component.

The controller may be configured to control movement of the one or more sections using the determined error by controlling movement of a plurality of sections to form an S-bend profile.

The controller may be configured to control the base to rotate in a first direction to coil the plurality of sections onto the base.

The controller may be configured to control the base to rotate in a second direction to uncoil the plurality of sections from the base.

The plurality of sections may have a length between the first free end section and the second end section. The controller may be configured to determine a coiled profile, one or more uncoiling profiles, and one or more handover positions using the coiled configuration, the trajectory and the length of the plurality of sections.

The controller may be configured to control storage of the determined coiled profile, the one or more determined uncoiling profiles, and the one or more determined handover positions in a memory.

The controller may be configured to determine the error in position and/or orientation by comparing the trajectory with one of the one or more determined uncoiling profiles.

The controller may be configured to determine control of movement of a plurality of sections between the first free end section and a handover position along the trajectory using a tip following algorithm. The tip following algorithm may use one of the one or more determined handover positions as a starting position for tip following.

The hyper redundant manipulator may be a continuum robot.

The coiled configuration may be a helical configuration.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
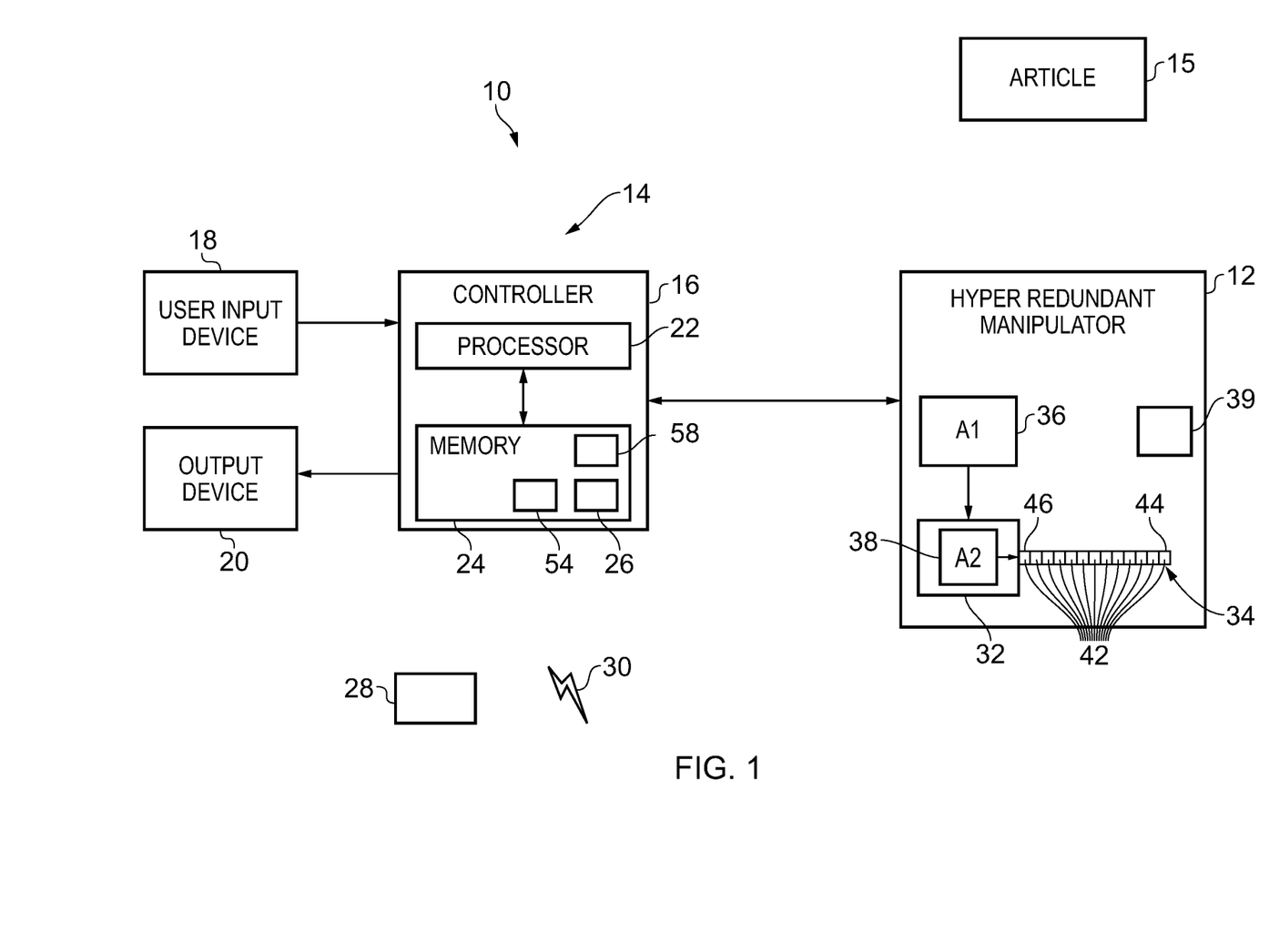
FIG. 1 illustrates a schematic diagram of apparatus for controlling a hyper redundant manipulator according to various examples.

FIG. 1 illustrates a schematic diagram of a system 10 comprising a hyper redundant manipulator 12, an apparatus 14 for controlling the hyper redundant manipulator 12, and an article 15. The apparatus 14 includes a controller 16, a user input device 18, and an output device 20. In some examples, the apparatus 14 may be a module. As used herein, the wording 'module' refers to a device or apparatus where one or more features are included at a later time and, possibly, by another manufacturer or by an end user. For example, where the apparatus 14 is a module, the apparatus 14 may only include the controller 16, and the remaining features may be added by another manufacturer, or by an end user.

The controller 16, the user input device 18, the output device 20 and the hyper redundant manipulator 12 may be coupled to one another via a wireless link and may consequently comprise transceiver circuitry and one or more antennas. Additionally or alternatively, the controller 16, the user input device 18, the output device 20, and the hyper redundant manipulator 12 may be coupled to one another via a wired link and may consequently comprise interface circuitry (such as a Universal Serial Bus (USB) socket). It should be appreciated that the controller 16, the user input device 18, the output device 20, and the hyper redundant manipulator 12 may be coupled to one another via any combination of wired and wireless links.

Figure 3:
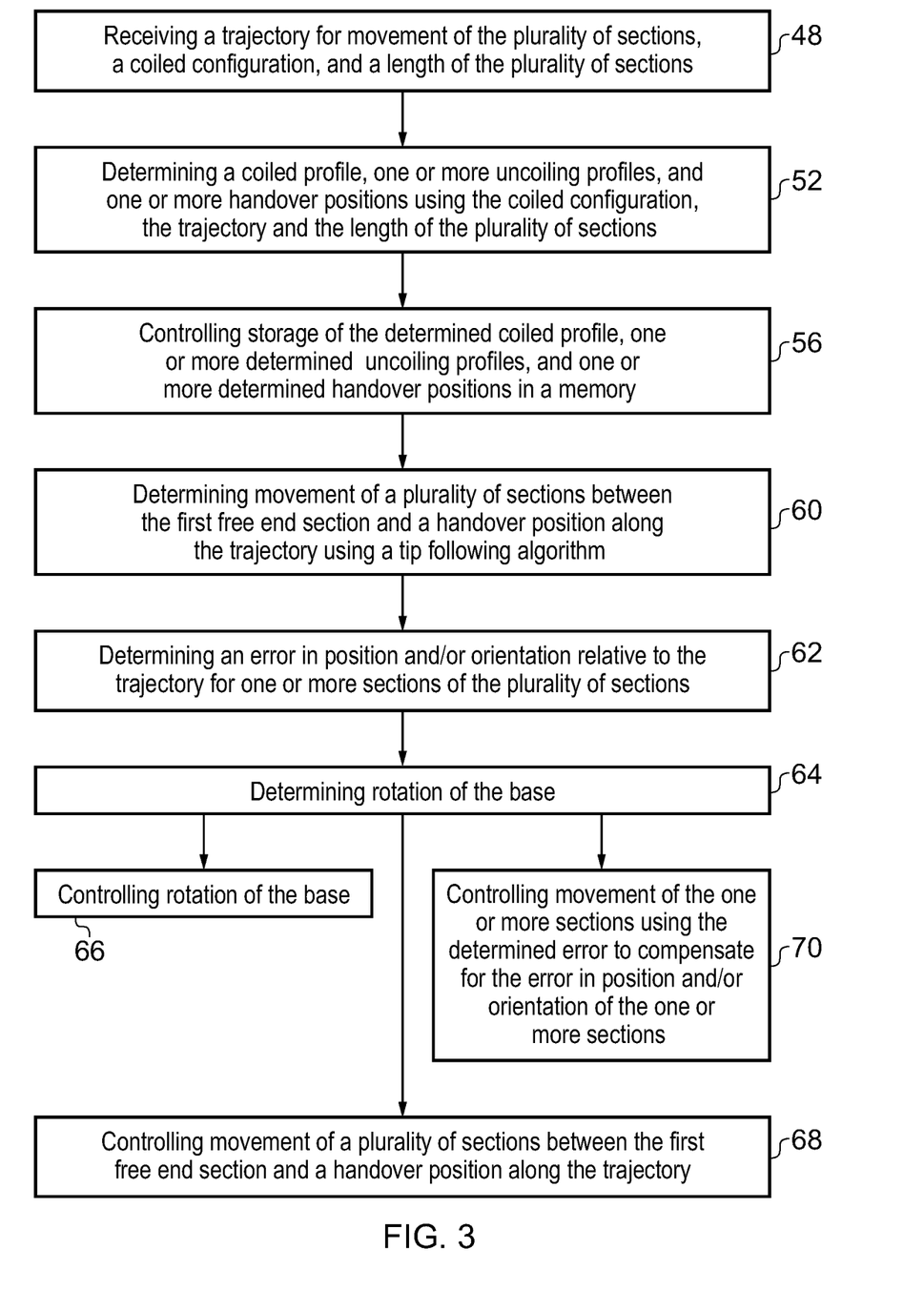
FIG. 3 illustrates a flow diagram of a method of controlling a hyper redundant manipulator according to various examples.

The controller 16 may comprise any suitable circuitry to cause performance of the methods described herein and as illustrated in FIG. 3. The controller 16 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controller (PLCs); and/or at least one microprocessor; and/or at least one microcontroller; and/or a central processing unit (CPU); and/or a graphics processing unit (GPU), to perform the methods.

In various examples, the controller 16 may comprise at least one processor 22 and at least one memory 24. The memory 24 stores a computer program 26 comprising computer readable instructions that, when read by the processor 22, causes performance of the methods described herein, and as illustrated in FIG. 3. The computer program 26 may be software or firmware, or may be a combination of software and firmware.

The processor 22 may be located on the hyper redundant manipulator 12, or may be located remote from the hyper redundant manipulator 12, or may be distributed between the hyper redundant manipulator 12 and a location remote from the hyper redundant manipulator 12. The processor 22 may include at least one microprocessor and may comprise a single core processor, may comprise multiple processor cores (such as a dual core processor or a quad core processor), or may comprise a plurality of processors (at least one of which may comprise multiple processor cores).

The memory 24 may be located on the hyper redundant manipulator 12, or may be located remote from the hyper redundant manipulator 12, or may be distributed between the hyper redundant manipulator 12 and a location remote from the hyper redundant manipulator 12. The memory 24 may be any suitable non-transitory computer readable storage medium, data storage device or devices, and may comprise a hard disk and/or solid state memory (such as flash memory). The memory 24 may be permanent non-removable memory, or may be removable memory (such as a universal serial bus (USB) flash drive or a secure digital card). The memory 24 may include: local memory employed during actual execution of the computer program; bulk storage; and cache memories which provide temporary storage of at least some computer readable or computer usable program code to reduce the number of times code may be retrieved from bulk storage during execution of the code.

The computer program 26 may be stored on a non-transitory computer readable storage medium 28. The computer program 26 may be transferred from the non-transitory computer readable storage medium 28 to the memory 24. The non-transitory computer readable storage medium 28 may be, for example, a USB flash drive, a secure digital (SD) card, an optical disc (such as a compact disc (CD), a digital versatile disc (DVD) or a Blu-ray disc). In some examples, the computer program 26 may be transferred to the memory 24 via a signal 30 (which may be a wireless signal or a wired signal).

Input/output devices may be coupled to the apparatus 14 either directly or through intervening input/output controllers. Various communication adaptors may also be coupled to the controller to enable the apparatus 14 to become coupled to other apparatus or remote printers or storage devices through intervening private or public networks. Non-limiting examples include modems and network adaptors of such communication adaptors.

The user input device 18 may comprise any suitable device for enabling an operator to at least partially control the apparatus 14. For example, the user input device 18 may comprise one or more of a keyboard, a keypad, a touchpad, a touchscreen display, and a computer mouse. The controller 16 is configured to receive signals from the user input device.

The output device 20 may be any suitable device for conveying information to an operator. For example, the output device 20 may be a display (such as a liquid crystal display, or a light emitting diode display, or an active matrix organic light emitting diode display, or a thin film transistor display, or a cathode ray tube display), and/or a loudspeaker, and/or a printer (such as an inkjet printer or a laser printer). The controller 16 is arranged to provide a signal to the output device 20 to cause the output device 20 to convey information to the operator.

The hyper redundant manipulator 12 may be any hyper redundant manipulator, and may be, for example, a snake arm robot or an elephant trunk robot. The hyper redundant manipulator 12 includes a base 32, an arm 34, a first actuator 36 and a second actuator 38. In some examples, the hyper redundant manipulator 12 may include a robotic moving platform 39 on which the base 32, the arm 34, the first actuator 36 and the second actuator 38 are mounted. For example, the robotic moving platform 39 may comprise a walking robot (such as a hexapod walking robot) on which the base 32, the arm 34, the first actuator 36 and the second actuator 38 are mounted.

Figure 2:
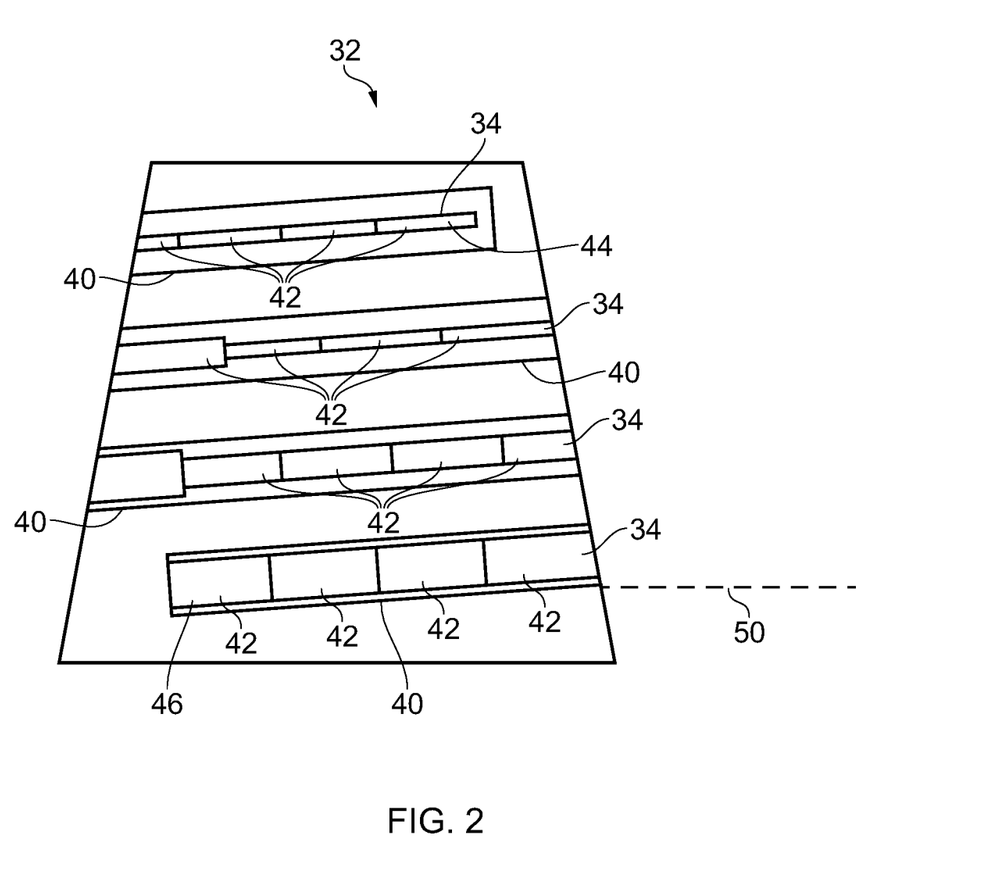
FIG. 2 illustrates a side view of a hyper redundant manipulator according to various examples.

The base 32 may house the second actuator 38 and is arranged to receive the arm 34 in a coiled configuration. For example, as illustrated in FIG. 2, the base 32 may include a helical groove 40 and the arm 34 may be coiled around the base 32 within the helical groove 40. In other examples, the base 32 may have a different shaped groove (such as a planar groove) and consequently, the arm 34 may be coiled around the base 32 in a different configuration (such as a spiral configuration). The base 32 may be cylindrical or cone shaped and consequently the coiling of the arm 34 around the base 32 may be circular. In other examples, the base 32 may have a different shape (the base 32 may be a cuboid for example) and consequently, the coiling of the arm 34 around the base 32 may be non-circular. It should be appreciated that the coiled configuration may be two dimensional (that is, where the arm 34 has a planar arrangement such as a planar spiral) or may be three dimensional (that is, where the arm 34 is in a non-planar arrangement such as a helical configuration).

The arm 34 includes a plurality of sections 42 comprising a first free end section 44 and a second end section 46 that is connected to the base 32. The arm 34 may have a discrete structure where the sections 42 are connected to one another by discrete joints. In other examples, the arm 34 may have a continuum structure where a continuous backbone extends through the plurality of sections 42 and may flex to produce a smoothly curving profile. In further examples, the arm 34 may have a serpentine structure where each section 42 includes a plurality of discrete joints. A plurality of control cables (not illustrated to maintain the clarity of the figures) are connected between at least some of the sections 42 and the second actuator 38 to enable the arm 34 to be re-position and/or re-oriented.

The first actuator 36 is arranged to rotate the base 32 to enable the arm 34 to be coiled on, and uncoiled from the base 32. In some examples, the first actuator 36 may include a motor that provides torque to a gear arrangement to rotate the base 32. The controller 16 is configured to control the first actuator 36 to rotate the base 32.

The second actuator 38 is configured to control the plurality of control cables within the arm 34 to change the position and orientation of the arm 34. For example, the second actuator 38 may comprise a plurality of motors that are coupled to the control cables within the arm 34. The controller 16 is configured to control the second actuator 38 to change the position and/or orientation of the arm 34.

The article 15 may be any object, component, or assembly of components that are to be inspected and/or repaired by the hyper redundant manipulator 12. For example, the article 15 may be a gas turbine engine mounted on a wing of an aircraft. In another example, the article 15 may be a pressurised water reactor in a nuclear power station.

FIG. 3 illustrates a flow diagram of a method of controlling a hyper redundant manipulator according to various examples.

At block 48, the method includes receiving a trajectory for movement of the plurality of sections 42, a coiled configuration of the plurality of sections 42, and a length of the plurality of sections 42. For example, an operator may operate the user input device 18 to select or provide a numerical value for the length of the plurality of sections 42 and to provide an equation that describes the coiled configuration of the plurality of sections 42. For example, where the base 32 includes the helical groove 40, the operator may operate the user input device 18 to provide or select equation 1 below that describes the shape of the helical groove 40.

$$\begin{bmatrix} x_n \\ y_n \\ z_n \end{bmatrix} = \begin{matrix} r_{helix}\cos(2\pi n) \\ r_{helix}\sin(2\pi n) \\ n \times \lambda_{helix} \end{matrix} \qquad \text{Equation 1}$$

Where n is the rotation of the base 32 from the second end section 46 in revolutions, r is the radius and $\lambda$ is the pitch. By calculating equation 1 along the length of the arm 34, an array of Cartesian points can be determined which may be used to represent the helix graphically.

In some examples, the operator may operate the user input device 18 to interact with a graphical user interface displayed on a display of the output device 20 to define a trajectory for movement of the plurality of sections 42. For example, the operator may operate the user input device 18 to define the trajectory 50 illustrated in FIG. 2. The trajectory may define one or more vectors along which the plurality of sections 42 are to move, and an end position where the first free end 44 is to be positioned at the end of movement.

At block 52, the method includes determining a coiled profile of the plurality of sections 42, one or more uncoiling profiles of the plurality of sections 42, and one or more handover positions, using the coiled configuration, the trajectory and the length of the plurality of sections 42 received at block 48.

For example, where the arm 34 is a homogenous snake arm (that is, a snake arm where the length of each section 42 is the same) and is arranged to coil within the helical groove 40, a coiled (helical) profile can be determined by the controller 14 by having the same bending angle for each section 42 while the direction angle follows equation 2 below:

$$\emptyset = [a+a_0, 2a+a_0, \ldots, na+a_0]$$ Equation 2

Where $a_0$ is the starting direction and a is the pitch angle.

The controller 14 may determine the one or more uncoiling profiles by determining the position of the plurality of sections 42 as they uncoil from the base 32 and move towards the end position defined by the trajectory.

The handover position is a location in space from where the controller 14 is to control the plurality of sections 42 using a tip following algorithm 54. When using a tip following algorithm, the controller 14 controls the plurality of sections 42 so that as the arm 34 advances towards the end position of the trajectory, each section 42 moves towards the location previously occupied by the adjacent leading section 42. In this way, the sections 42 follow the locations previously occupied by the first free end section 44 and thus the plurality of sections 42 may maintain a shape while advancing towards the end position of the trajectory.

At block 56, the method includes controlling storage of the determined coiled profile, the one or more determined uncoiling profiles, and the one or more determined handover positions in a memory. For example, the controller 14 may control storage of the determined coiled profile, the one or more determined uncoiling profiles, and the one or more determined handover positions in a database 58 in the memory 24.

At block 60, the method includes determining movement of a plurality of sections between the first free end section 44 and a handover position along the trajectory using a tip following algorithm. For example, the controller 14 may determine movement for the plurality of sections 42 between the first free end section 44 and a handover position using the tip following algorithm 54. For uncoiling profiles where the length of the arm 34 uncoiled from the base 32 is less than a threshold length, block 60 is performed for all sections of the arm 34 that are uncoiled from the base 32 and a handover position is not used.

At block 62, the method includes determining an error in position and/or orientation relative to the trajectory for one or more sections of the plurality of sections 42. It should be appreciated that the error in the position and/or the orientation of the arm 34 relative to the trajectory is caused, at least in part, by the coiled configuration of the arm 34 around the base 32.

Figure 4:
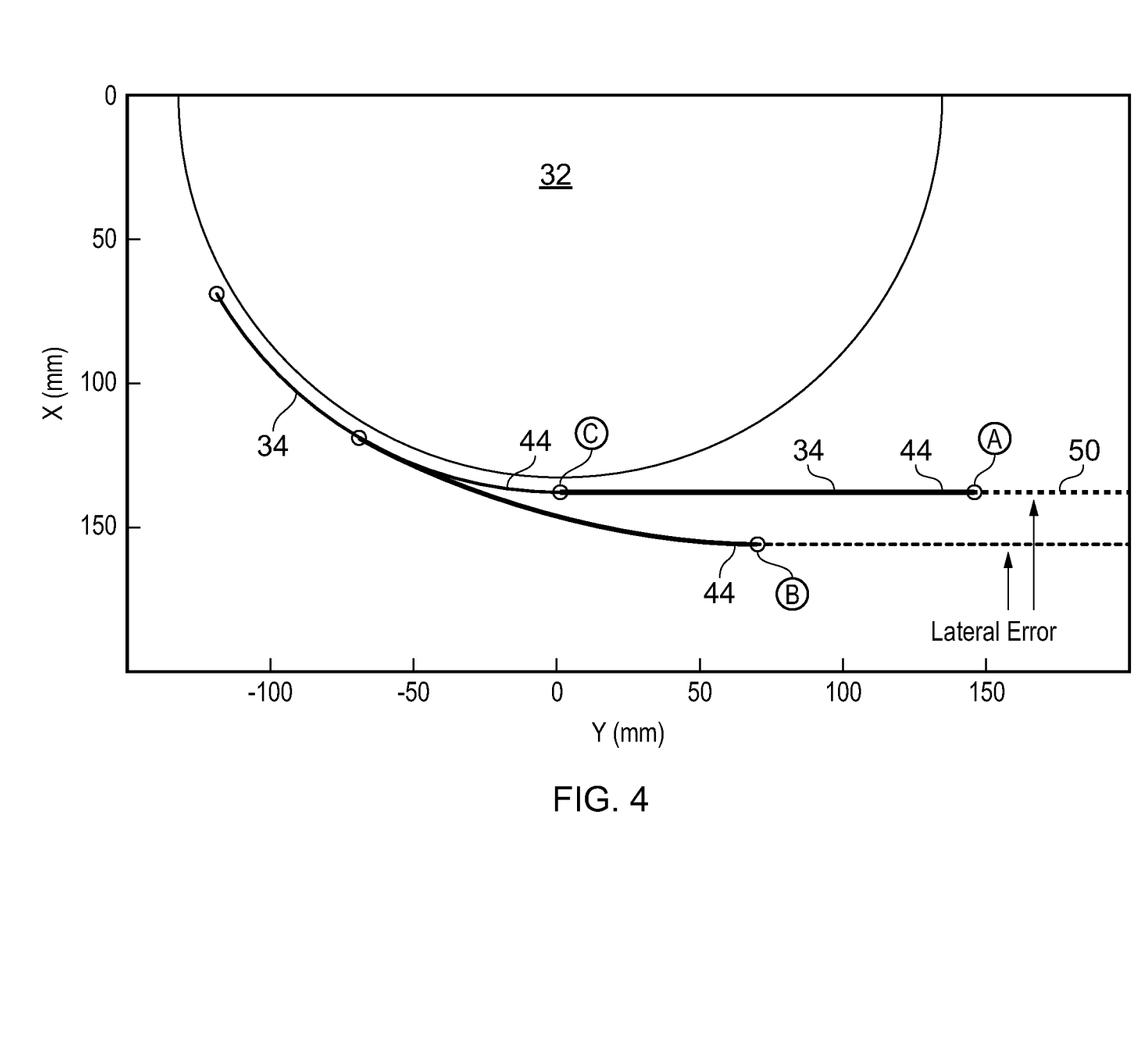
FIG. 4 illustrates a plan view of a hyper redundant manipulator in various uncoiling profiles positions according to various examples.

In more detail, the coiled configuration of the arm 34 causes a lateral error in position and orientation when the arm 34 is uncoiled from, and coiled on, the base 32. FIG. 4 illustrates a plan view of three uncoiling profiles of the arm 34 as the arm 34 is coiled onto, and uncoiled from, the base 32 (labelled as uncoiling profiles A, B and C).

In uncoiling profile A, the arm 34 is uncoiled more than in uncoiling profiles B and C. Additionally, the arm 34 is positioned along the trajectory 50 and oriented parallel to the trajectory 50.

In uncoiling profile B, the arm 34 is uncoiled more than in uncoiling profile C, but is less uncoiled less than in uncoiling profile A. The arm 34 is not positioned along the trajectory 50 and there is a lateral error between the arm 34 and the trajectory 50 (measured from the first free end section 44). The arm 34 also defines an angle with the trajectory 50.

Figure 5:
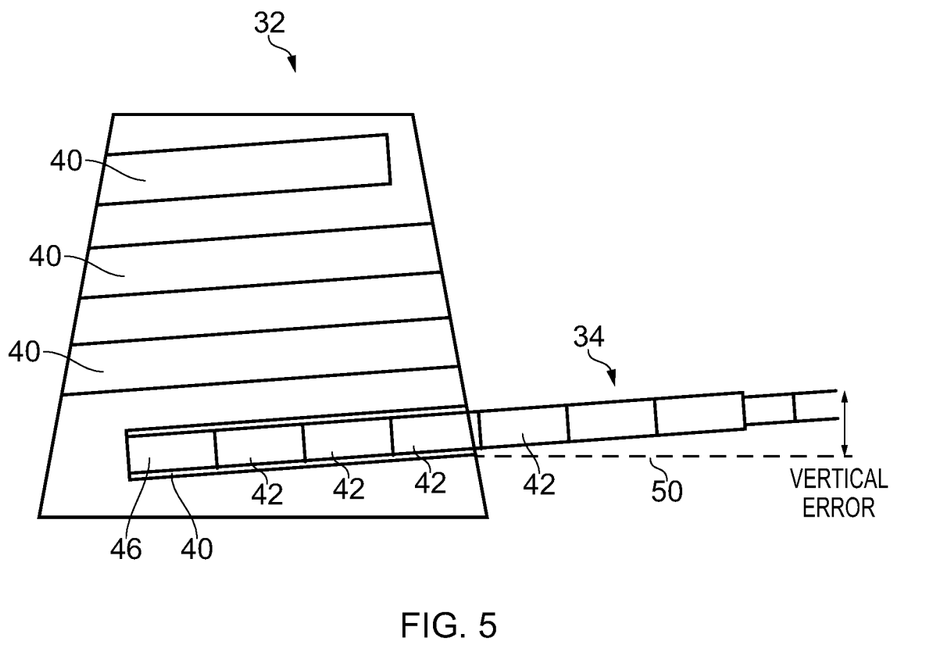
FIG. 5 illustrates a side view of a hyper redundant manipulator in an uncoiling profile according to various examples.

In uncoiling profile C, the arm 34 is uncoiled less than in uncoiling profiles A and B. Additionally, the arm 34 is positioned along the trajectory 50 and oriented parallel to the trajectory 50.

Where the coiled configuration of the arm 34 is three dimensional (a helical configuration for example), the coiled configuration of the arm 34 also causes a vertical error in position and orientation when the arm 34 is uncoiled from, and coiled on, the base 32. FIG. 5 illustrates a side view of an uncoiling profile of the arm 34 where the pitch of the helical groove 40 causes a vertical error in the position and orientation of the arm 34.

Figure 6A:
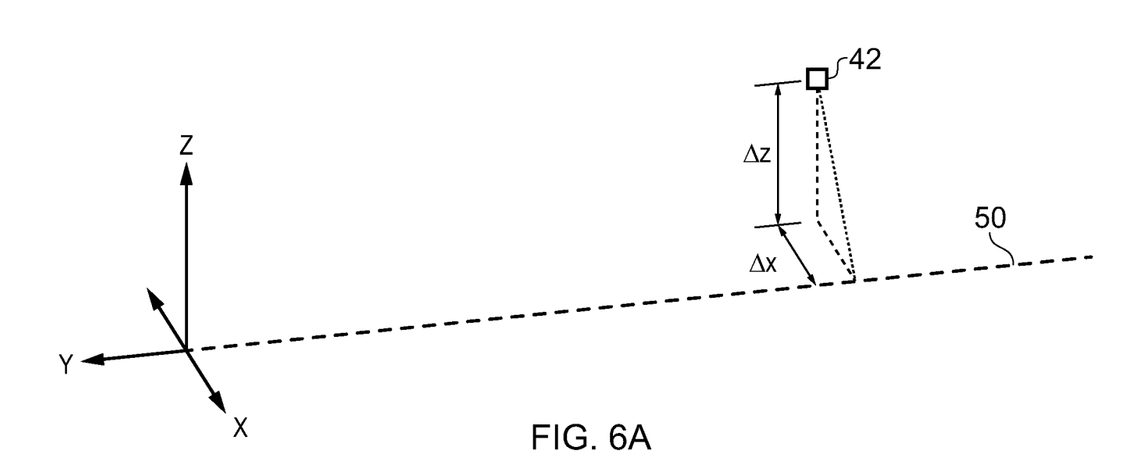
FIG. 6A illustrates a schematic diagram of an error in position of a section of a hyper redundant manipulator according to various examples.

For further explanation of the error in position caused by the coiling of the arm 34 and the pitch of the coiling, FIG. 6A illustrates a schematic diagram of an error in position of a section 42 relative to the trajectory 50. The error has a lateral displacement component ($\Delta x$) caused by the coiling of the arm 34 around the base 32, and a vertical displacement component ($\Delta z$) caused by the pitch of the coiling of the arm 34 around the base 32.

Figure 6B:
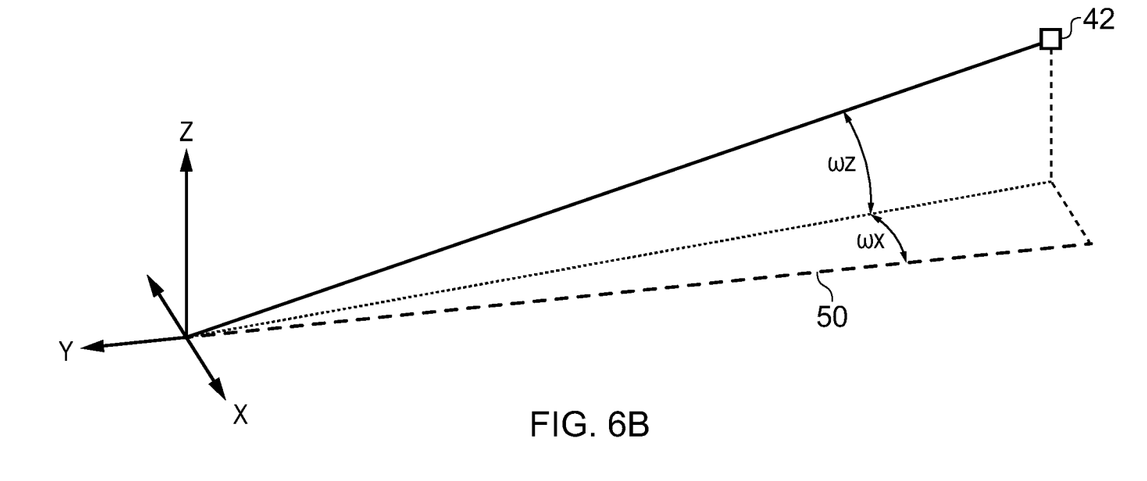
FIG. 6B illustrates a schematic diagram of an error in orientation of a section of a hyper redundant manipulator according to various examples.

For further explanation of the error in orientation caused by the coiling of the arm 34 and the pitch of the coiling, FIG. 6B illustrates a schematic diagram of an error in orientation of a section 42 relative to the trajectory 50. The error has a lateral angular component ($\omega x$) caused by the coiling of the arm 34 around the base 32, and a vertical angular component ($\omega z$) caused by the pitch of the coiling of the arm 34 around the base 32.

Returning to FIG. 3, at block 62, the controller 14 receives a desired change in length of the arm 34 from the base 32 from the tip following algorithm (determined at block 60). Where the desired uncoiling profile for that change in length from the base 32 has been calculated at block 52 and stored at block 56, the controller 14 may use the stored uncoiling profile saved in the database 58 in the memory 24. Where the desired uncoiling profile for that change in length from the base 32 has not been calculated at block 52 or stored at block 56, the controller 14 may determine an uncoiled profile and a handover position at block 62.

At block 62, the controller 14 may determine the lateral error in position ($\Delta x$) and orientation ($\omega x$) caused by the coiling of the arm 34 and, where the coiling of the arm 34 is three dimensional, the vertical error in position ($\Delta z$) and orientation ($\omega z$). The controller 14 may determine the error in position and orientation by comparing the position and orientation of the sections 42 in the uncoiling profile associated with the desired change in length of the arm 34 from the base 32 with the trajectory 50.

In more detail, the controller 14 determines the lateral and vertical errors in position (Δx, Δz) by measuring their planar distance from the trajectory as illustrated in FIG. 6A. The controller 14 determines the lateral and vertical errors in orientation using equations 3 to 6 below:

$$q' = R_{Sol} \times q \quad \text{Equation 3}$$

$$\omega_x = |\arctan(q'_z/q'_y)| \quad \text{Equation 4}$$

$$\omega_z = |\arctan(q'_z/q'_x)| \quad \text{Equation 4}$$

When $$q = \begin{bmatrix} 0 \\ 0 \\ 1 \end{bmatrix} \quad \text{Equation 5}$$

$$\begin{bmatrix} 0 \\ 1 \\ 0 \end{bmatrix} = R_{Traj} \times q \quad \text{Equation 6}$$

Where $R_{sol}$ and $R_{Traj}$ are the rotational matrices of the section end and the trajectory respectively as illustrated in FIG. 6B.

At block 64, the method includes determining rotation of the base 32. For example, the controller 14 may receive a desired change in length (ΔL) of the arm 34 from the base 32 from the tip following algorithm (determined at block 60) and use equation 7 below to determine the corresponding rotation (Δα) of the base 32:

$$\Delta\alpha = \frac{\Delta L}{r\sqrt{1 + (\lambda_{helix}/2\pi r)^2}} \quad \text{Equation 7}$$

Where r is the radius of the base 32 and λ is the pitch of the coiling of the arm 34 around the base 32.

At block 66, the method includes controlling rotation of the base 32. For example, the controller 14 may control the first actuator 36 to rotate the base 32 using the determined rotation from block 66.

At block 68, the method includes controlling movement of a plurality of sections 42 between the first free end section 44 and a handover position along the trajectory. For example, the controller 14 may use the movement determined at block 60 to control the second actuator 38 to move the plurality of sections 42 between the first free end section 44 and a handover position along the trajectory 50 so that each section 42 moves to the position previously occupied by the adjacent forward section 42 (and hence the plurality of sections 42 follow the first free end section 44).

At block 70, the method includes controlling movement of the one or more sections using the determined error to compensate for the error in position and/or orientation of the one or more sections. For example, the controller 14 may control the second actuator 38 to move one or more sections 42 using the error determined at block 62 to compensate for the error in position and/or orientation of the one or more sections 42.

In some examples, the controller 14 controls movement of the one or more sections 42 using the determined error by controlling movement of a plurality of sections 42 to form an S-bend profile. As used herein, an S-bend profile may be defined as a configuration of the arm 34 including: a first portion that is spaced apart from the trajectory and has an orientation that defines an angle with the trajectory; a second intermediate portion; and a third portion that is positioned on, and is oriented parallel to the trajectory. The orientation and length of the second intermediate portion is determined so that the third portion is positioned on, and is oriented parallel to the trajectory. Where the arm 34 has a continuum structure, the first and second portions are connected via a first curved portion and the second and third portions are connected via a second curved portion.

Figure 7:
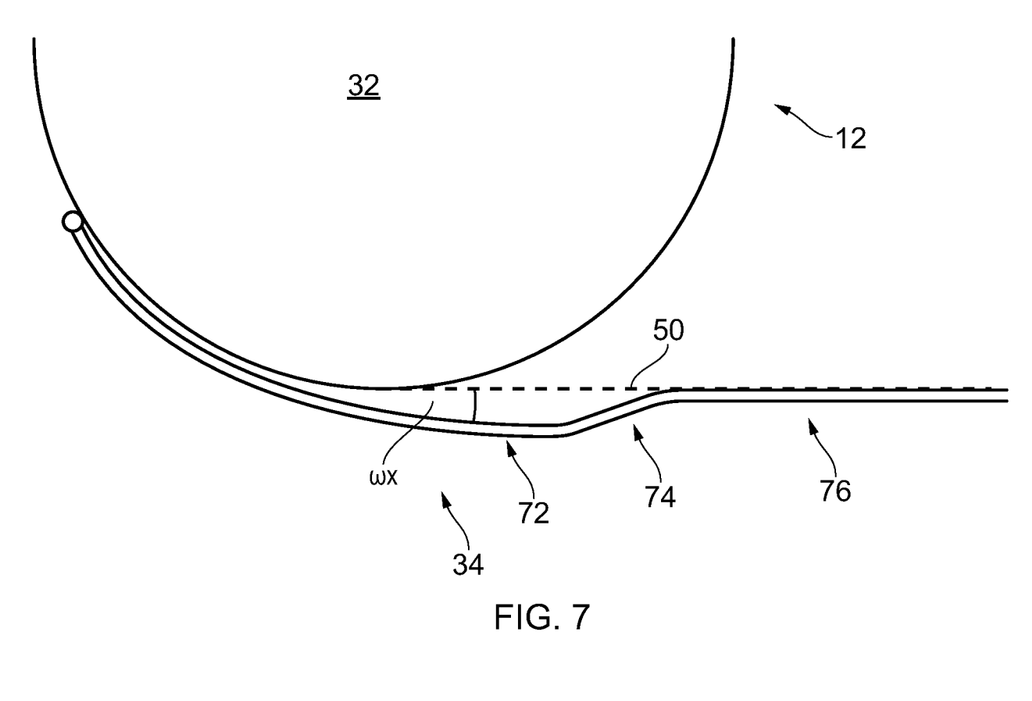
FIG. 7 illustrates a plan view of a hyper redundant manipulator where a lateral error is compensated by a lateral S-bend.

FIG. 7 illustrates a plan view of a hyper redundant manipulator 12 where a lateral error is compensated by a lateral S-bend. The lateral S-bend includes: a first portion 72 that is laterally spaced from the trajectory 50 and defines an angle (ωx) with the trajectory 50; a second portion 74 that defines an angle with the trajectory 50 that is opposite in sign to the angle (ωx) defined by the first portion 72; and a third portion 76 that is positioned on, and oriented parallel, to the trajectory 50.

Figure 8:
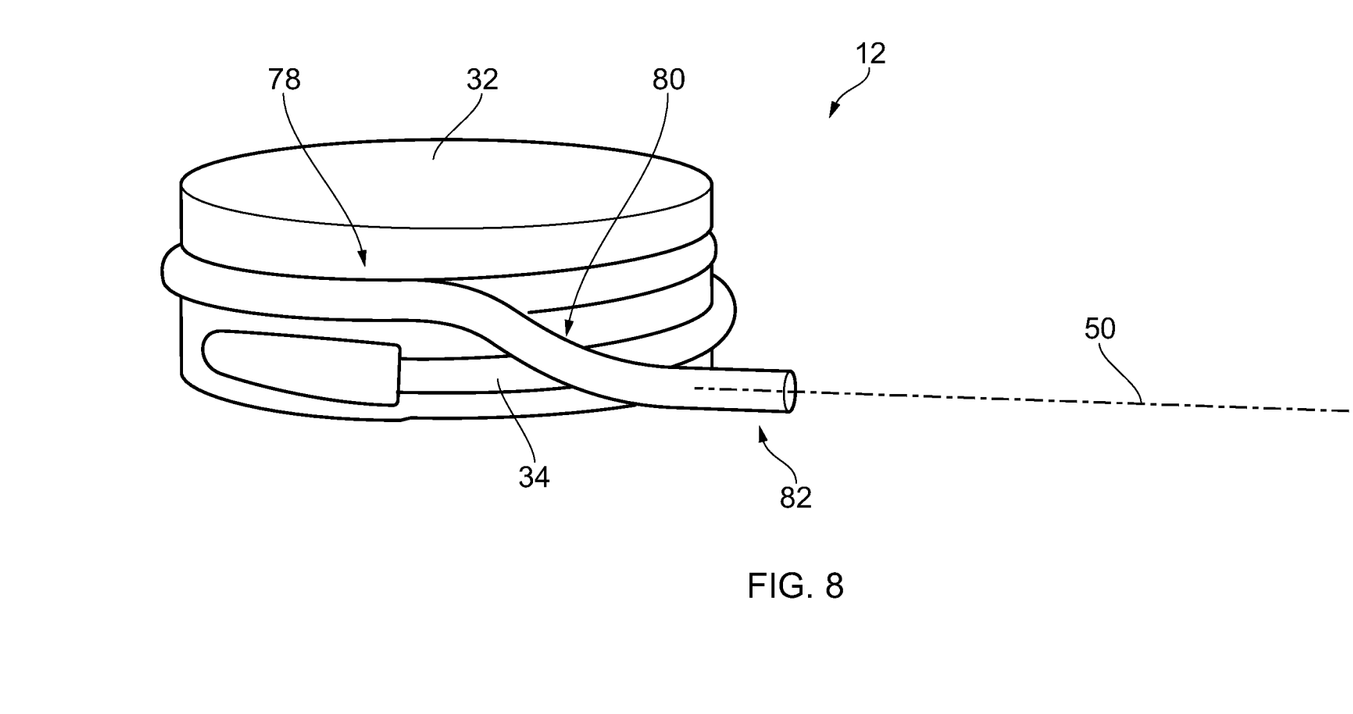
FIG. 8 illustrates a perspective view of a hyper redundant manipulator where a vertical error is compensated by a vertical S-bend.

FIG. 8 illustrates a perspective view of a hyper redundant manipulator 12 where a vertical error is compensated by a vertical S-bend. The vertical S-bend includes: a first portion 78 that is vertically spaced from the trajectory 50 and defines an angle (ωz) with the trajectory 50, a second portion 80 that defines an angle with the trajectory 50 that is opposite in sign to the angle (ωz) defined by the first portion 78; and a third portion 82 that is positioned on, and oriented parallel, to the trajectory 50.

It should be appreciated that blocks 66, 68, 70 may be performed simultaneously so that the arm 34 is manipulated by the second actuator 38 while the base 32 is being rotated by the first actuator 36. In other examples, blocks 66, 68, 70 may be performed sequentially. For example, block 66 may first be performed, then block 70, and then block 68.

The method may then return to block 60. Alternatively, where the first free end section 44 reaches the end position defined by the trajectory 50, the method may end.

The apparatus 10 and the method described above may provide several advantages. First, the coiling of the arm 34 around the base 32 may occupy relative little space and consequently, the hyper redundant manipulator 12 may be relatively compact and may thus be mounted on a robotic moving platform 39. Second, the uncoiling and coiling of the arm 34 around the base 32 is actively controlled to position and orient the arm 34 on the trajectory 50 and this may increase the accuracy of the positioning and orientation of the first free end section 44 of the arm 34. Where the first free end section 44 is coupled to inspection apparatus and/or repair apparatus, this may enable the article 15 to be accurately inspected and/or repaired.

It will be understood that the invention is not limited to the embodiments above-described and various modifications and improvements can be made without departing from the concepts described herein. For example, the different embodiments may take the form of an entirely hardware embodiment, an entirely software embodiment, or an embodiment containing both hardware and software elements. By way of another example, the method illustrated in FIG. 3 may not include blocks 52 and 56 and instead, the uncoiling profile and the handover position may be determined at block 60.

Except where mutually exclusive, any of the features may be employed separately or in combination with any other features and the disclosure extends to and includes all combinations and sub-combinations of one or more features described herein.

What is claimed is:

1. A method of controlling a hyper redundant manipulator, the hyper redundant manipulator including: a plurality of sections comprising a first free end section and a second end section; and a base arranged to receive the plurality of sections in a coiled configuration, the base being coupled to the second end section of the plurality of sections, the method comprising:
receiving a trajectory for movement of the plurality of sections;
determining an error in position and/or orientation relative to the trajectory for one or more sections of the plurality of sections, the error being calculated based at least in part on the coiled configuration; and
controlling movement of the one or more sections using the determined error to compensate for the error in position and/or orientation of the one or more sections.

2. A method as claimed in claim 1, wherein the error in position and/or orientation relative to the trajectory comprises a lateral component.

3. A method as claimed in claim 1, wherein the error in position and/or orientation relative to the trajectory comprises a vertical component.

4. A method as claimed in claim 1, wherein controlling movement of the one or more sections using the determined error comprises controlling movement of a plurality of sections to form an S-bend profile.

5. A method as claimed in claim 1, further comprising controlling the base to rotate in a first direction to coil the plurality of sections onto the base.

6. A method as claimed in any of the preceding claims, further comprising controlling the base to rotate in a second direction to uncoil the plurality of sections from the base.

7. A method as claimed in claim 1, wherein the plurality of sections has a length between the first free end section and the second end section, the method further comprising determining a coiled profile, one or more uncoiling profiles, and one or more handover positions using the coiled configuration, the trajectory and the length of the plurality of sections.

8. A method as claimed in claim 7, further comprising controlling storage of the determined coiled profile, the one or more determined uncoiling profiles, and the one or more determined handover positions in a memory.

9. A method as claimed in claim 7, wherein determining the error in position and/or orientation includes comparing the trajectory with one of the one or more determined uncoiling profiles.

10. A method as claimed in claim 7, further comprising determining control of movement of a plurality of sections between the first free end section and a handover position along the trajectory using a tip following algorithm, the tip following algorithm using one of the one or more determined handover positions as a starting position for tip following.

11. A method as claimed in claim 1, wherein the hyper redundant manipulator is a continuum robot.

12. A method as claimed in claim 1, wherein the coiled configuration is a helical configuration.

13. A non-transitory computer readable storage medium comprising computer readable instructions that, when read by a computer, cause performance of the method of claim 1.

14. Apparatus for controlling a hyper redundant manipulator, the hyper redundant manipulator including: a plurality of sections comprising a first free end section and a second end section; and a base arranged to receive the plurality of sections in a coiled configuration, the base being coupled to the second end section of the plurality of sections, the apparatus comprising a controller configured to:
receive a trajectory for movement of the plurality of sections;
determine an error in position and/or orientation relative to the trajectory for one or more sections of the plurality of sections, the error being calculated based at least in part on the coiled configuration; and
control movement of the one or more sections using the determined error to compensate for the error in position and/or orientation of the one or more sections.

15. Apparatus as claimed in claim 14, wherein the controller is configured to control the base to rotate in a first direction to coil the plurality of sections onto the base.

16. Apparatus as claimed in claim 14, wherein the controller is configured to control the base to rotate in a second direction to uncoil the plurality of sections from the base.

17. Apparatus as claimed in claim 14, wherein the plurality of sections has a length between the first free end section and the second end section, and the controller is configured to determine a coiled profile, one or more uncoiling profiles, and one or more handover positions using the coiled configuration, the trajectory and the length of the plurality of sections.

18. Apparatus as claimed in claim 17, wherein the controller is configured to control storage of the determined coiled profile, the one or more determined uncoiling profiles, and the one or more determined handover positions in a memory.

19. Apparatus as claimed in claim 17, wherein the controller is configured to determine the error in position and/or orientation by comparing the trajectory with one of the one or more determined uncoiling profiles.

20. Apparatus as claimed in claim 17, wherein the controller is configured to determine control of movement of a plurality of sections between the first free end section and a handover position along the trajectory using a tip following algorithm, the tip following algorithm using one of the one or more determined handover positions as a starting position for tip following.

* * * * *